US012761927B2

(12) United States Patent
Choi et al.

(10) Patent No.: US 12,761,927 B2
(45) Date of Patent: Oct. 13, 2026

(54) SYSTEM-ON-CHIP FOR SHARING GRAPHICS PROCESSING UNIT THAT SUPPORTS MULTIMASTER, AND METHOD FOR OPERATING GRAPHICS PROCESSING UNIT

(71) Applicant: TELECHIPS INC., Seoul (KR)

(72) Inventors: Jong-Sang Choi, Seoul (KR); Moon-Soo Kim, Seoul (KR)

(73) Assignee: TELECHIPS INC., Seoul (KR)

( * ) Notice: Subject to any disclaimer, the term of this patent is extended or adjusted under 35 U.S.C. 154(b) by 93 days.

(21) Appl. No.: 18/947,754

(22) Filed: Nov. 14, 2024

(65) Prior Publication Data

US 2025/0068431 A1 Feb. 27, 2025

Related U.S. Application Data

(62) Division of application No. 17/778,961, filed as application No. PCT/KR2020/016794 on Nov. 25, 2020, now Pat. No. 12,182,584.

(30) Foreign Application Priority Data

Dec. 23, 2019 (KR) ........................ 10-2019-0173272

(51) Int. Cl.
*G06F 9/4401* (2018.01)
*G06F 9/455* (2018.01)

(52) U.S. Cl.
CPC ........ *G06F 9/4408* (2013.01); *G06F 9/45558* (2013.01); *G06F 2009/45562* (2013.01)

(58) Field of Classification Search
CPC ..................................................... G06F 9/4408
See application file for complete search history.

(56) References Cited

U.S. PATENT DOCUMENTS 9,875,115 B2 * 1/2018 Russinovich ........... G06F 8/656
2010/0146620 A1 6/2010 Simeral
(Continued)

FOREIGN PATENT DOCUMENTS

JP 2006-201919 A 8/2006
JP 2013-500520 A 1/2013
(Continued)

OTHER PUBLICATIONS

International Search Report and Written Opinion from PCT/KR2020/016794.

*Primary Examiner* — Phil K Nguyen
(74) *Attorney, Agent, or Firm* — NKL Law; Jae Youn Kim

(57) ABSTRACT

A system-on-a-chip sharing a graphics processing unit supporting multi-master is provided. A system on chip (SoC) comprises a plurality of central processing units (CPUs) for executing at least one operating system, a graphics processing unit (GPU) that is connected to each of the plurality of CPUs via a bus interface and communicates with each of the plurality of CPUs, and at least one state monitoring device that is selectively connected to at least one CPU among the plurality of CPUs and transmits execution state information of at least one operating system executed in the connected CPU to the GPU. The GPU is shared by at least one operating system and controls a sharing operation by the at least one operating system based on the execution state information of the at least one operating system.

3 Claims, 7 Drawing Sheets

(56) References Cited

U.S. PATENT DOCUMENTS

| | | | | |
|---|---|---|---|---|
| 2011/0060947 | A1* | 3/2011 | Song | G06F 21/53 718/1 |
| 2011/0066879 | A1* | 3/2011 | Nakai | G06F 8/63 718/1 |
| 2011/0113219 | A1 | 5/2011 | Golshan | |
| 2011/0145916 | A1 | 6/2011 | Mckenzie | |
| 2016/0117497 | A1* | 4/2016 | Saxena | G06F 21/566 726/26 |
| 2017/0329623 | A1 | 11/2017 | Dong | |
| 2017/0358278 | A1 | 12/2017 | Lee | |
| 2019/0213032 | A1 | 7/2019 | Eyal | |
| 2020/0098081 | A1 | 3/2020 | Li | |
| 2021/0349734 | A1 | 11/2021 | Novales | |

FOREIGN PATENT DOCUMENTS

| | | | |
|---|---|---|---|
| JP | 2014-203230 | A | 10/2014 |
| JP | 6066807 | B2 | 1/2017 |
| KR | 10-2009-0016286 | A | 2/2009 |
| KR | 10-2012-0054027 | A | 5/2012 |
| KR | 10-1694302 | B1 | 1/2017 |

* cited by examiner

SYSTEM-ON-CHIP FOR SHARING GRAPHICS PROCESSING UNIT THAT SUPPORTS MULTIMASTER, AND METHOD FOR OPERATING GRAPHICS PROCESSING UNIT

CROSS-REFERENCE TO RELATED APPLICATION

This application is a divisional of application Ser. No. 17/778,961 filed May 23, 2022, which is a U.S. National Stage Application of International Application No. PCT/KR2020/016794, filed on Nov. 25, 2020, which claims priority to and the benefit of Korean Patent Application No. 10-2019-0173272 filed in the Korean Intellectual Property Office on Dec. 23, 2019, the entire contents of which are incorporated herein by reference.

BACKGROUND

(a) Field

The present invention relates to a system on chip (hereinafter, collectively referred to as 'SoC') sharing a graphics processing unit (hereinafter, collectively referred to as 'GPU') and a method for operating the SoC. Further, the present invention relates to an SoC equipped with a GPU supporting multi-master.

(b) Description of the Related Art

Recently, according to an SoC design, various central processing units (hereinafter, collectively referred to as 'CPU') and operating systems (hereinafter, collectively referred to as 'OS') executed in the CPUs are provided.

In general, different OSs request a single GPU or a plurality of GPUs to process a high parallel computing job or image rendering. Depending on use cases of the SoC, GPU computing power required by each OS may be changed.

When a plurality of CPUs and a plurality of GPUs are mounted on the SoC, one CPU can send a job only to a GPU dedicated to the one CPU and the other CPU can also send a job only to a GPU dedicated to the other CPU. Therefore, GPUs can only perform a job requested by one OS. For example, if the SoC is equipped with three OSs and two GPUs, two OSs of the three OSs are mounted on one CPU and one OS is mounted on the other CPU. At this time, two OSs mounted on one CPU cannot use one GPU at the same time. Therefore, only two OSs mounted on different CPUs can use each dedicated GPU. As a result, even if a plurality of OSs is mounted on the SoC, there may be an OS that cannot use the GPU, which becomes a limitation of the SoC.

Conventionally, in order to solve this problem, a technique for providing multi-master support for a GPU using a hypervisor has been used. The GPU supported rebooting of multi-master using the hypervisor.

However, the hypervisor is extensively used to guarantee various GPU computing performance requirements and system operations in addition to supporting multi-master. However, using the hypervisor may burden the system in terms of development complexity and cost.

SUMMARY

An embodiment of the present invention provides a system on chip (SoC) that enables a plurality of OS to share a GPU using a system monitoring module for transmitting OS execution state information of a CPU, and a method for operating a GPU.

Further, an embodiment of the present invention provides a method for operating an SoC and a GPU. In the method, by being equipped with a GPU supporting multi-master and selectively connecting a system monitoring module mounted on the SoC with an OS or a CPU, all OSs get to share the GPU via the system monitoring module, or all OSs get to share the GPU via a hypervisor, or some OSs get to share the GPU via the system monitoring module and some OSs get to share the GPU via the hypervisor. As a result, the method can cover various use cases regardless of whether there is a hypervisor.

According to an embodiment of the present invention, system on chip (SoC) is provided. The SoC includes a plurality of central processing units (CPUs) for executing at least one operating system, a graphics processing unit (GPU) that is connected to each of the plurality of CPUs via a bus interface and communicates with each of the plurality of CPUs, and at least one state monitoring device that is selectively connected to at least one CPU among the plurality of CPUs and transmits execution state information of the at least one operating system executed in the connected CPU to the GPU. The GPU is shared by the at least one operating system and controls a sharing operation by the at least one operating system based on the execution state information of the at least one operating system.

The GPU may distinguish an operating system in an abnormal state based on the execution state information of the at least one operating system and properly terminate a job of the distinguished operating system.

When the operating system in an abnormal state is determined to be a host operating system, the GPU may suspend a configuration until a reboot of the operating system in an abnormal state is completed.

The plurality of CPUs may include a first CPU for executing a first standalone operating system, and a second CPU for executing a second standalone operating system. The at least one state monitoring device may include a first state monitoring device that is connected to the first CPU and transmits execution state information of the first standalone operating system to the GPU, and a second state monitoring device that is connected to the second CPU and transmits execution state information of the second standalone operating system to the GPU.

The plurality of CPUs may include a first CPU for executing a standalone operating system, and a second CPU for executing a hypervisor program and at least one guest operating system based on the hypervisor program. The at least one state monitoring device may include a first state monitoring device that is connected to the first CPU and transmits execution state information of the standalone operating system to the GPU. The hypervisor program may transmit execution state information of the at least one guest operating system to the GPU.

The plurality of CPUs may include a first CPU for executing a standalone operating system, and a second CPU for executing a second standalone operating system, a hypervisor program, and at least one guest operating system based on the hypervisor program. The at least one state monitoring device may include a first state monitoring device that is connected to the first CPU and transmits execution state information of the first standalone operating system to the GPU, and a second state monitoring device that is connected to the second CPU and transmits execution state information of the second standalone operating system to the GPU. The hypervisor program may transmit execution state information of the at least one guest operating system to the GPU.

According to another embodiment of the present invention, a method of operating a GPU mounted on an SoC is provided. The method includes collecting execution state information of operating systems executed in each CPU from at least two CPUs, determining whether there is an operating system operating in an abnormal state based on the execution state information, and terminating properly an existing job of the operating system operating in an abnormal state and waiting until a reboot of the operating system operating in an abnormal state is completed. Here, the GPU may perform a sharing operation that processes jobs requested by the operating systems, and the execution state information may be collected via a bus interface that is connected to a state monitoring device connected to at least one CPU.

One of the operating systems may operate as a host operating system, and, after determining whether there is an operating system operating in an abnormal state based on the execution state information, configuration of a GPU may be suspended until the reboot of the operating system operating in an abnormal state is completed.

The execution state information may be collected from a hypervisor executed in an arbitrary CPU, and include execution state information of at least one guest operating system executed by the hypervisor.

The execution state information may include execution state information of at least one standalone operating system collected via a bus interface that is connected to a state monitoring device connected to the at least one CPU, and execution state information of at least one guest operating system collected from a hypervisor executed in an arbitrary CPU.

According to an embodiment of the present invention, various use cases can be covered with a single SoC regardless of whether there is a hypervisor. In addition, through sharing a GPU, computing power can theoretically be increased by up to 100%.

In addition, in case of rebooting one of the OSs mounted on the SoC or an occurrence of an abnormal situation, the GPU can recognize such a case, which prevents other OSs from being affected. As a result, system safety can be guaranteed and a reboot of each core can be supported.

In addition, since a system monitoring device mounted on the SoC transmits execution state information of a connected CPU or OS to the GPU, the GPU can recognize the execution state information of all CPUs or OSs. Accordingly, since a plurality of CPUs or OSs can share a GPU without a hypervisor, use cost of the hypervisor can be reduced and system cost can be cut down.

DETAILED DESCRIPTION OF THE EMBODIMENTS

Figure 1:
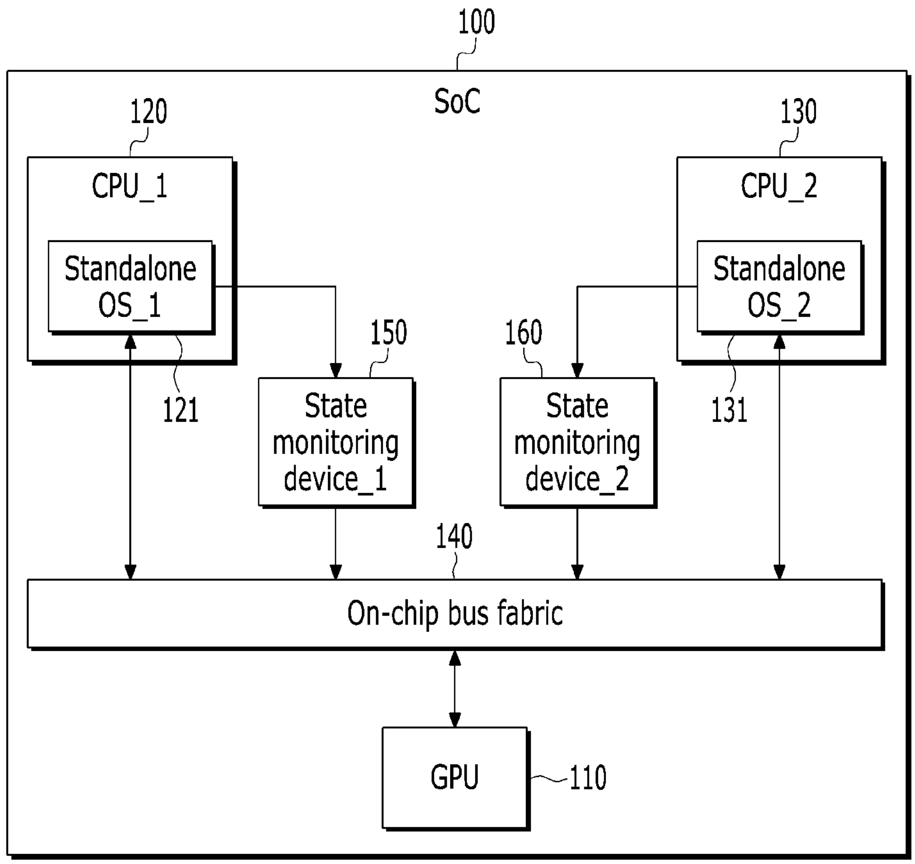
FIG. 1 is a block diagram showing a configuration of a system-on-chip (SoC) according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, when a part is referred to "include" a certain constituent element, it means that it may further include other constituent elements rather than exclude other elements, unless specifically indicates otherwise.

In the description, the terms such as " . . . unit", " . . . er/or", " . . . module", and the like refer to units that process at least one function or operation, which may be implemented with a hardware, a software or a combination thereof.

In the description, "transmission" or "provision" may include direct transmission or provision, as well as indirect transmission or provision through other devices or by way of bypass.

In the description, expressions described in the singular in this specification may be interpreted as the singular or plural unless an explicit expression such as "one" or "single" is used.

In this specification, the same reference numerals designate the same constituent elements throughout all the drawings, and "and/or" includes each of the constituent elements and all combinations thereof.

The ordinal numbers such as "first" and "second" are used for describing various constituent elements but does not limit the constituent elements. Further, the ordinal numbers are used only for distinguishing a constituent element from another constituent element.

In the present specification, a central processing unit (central processing unit, hereinafter, collectively referred to as a 'CPU') receives information from the outside, stores the received information, interprets and operates program instructions of a computer program, and outputs to the outside. The CPU controls overall operations of a computer while exchanging information with computer parts. The CPU executes a software, such as an application program, an operating system (hereinafter, collectively referred to as an 'OS'), and device drivers. The CPU executes the OS which is loaded onto a working memory. The CPU executes various application programs to be driven OS-based.

The CPU may be provided as a multi-core processor including at least two independently drivable processors. Each of the processors can independently read and execute program instructions. Processors may be driven by different power supply voltages or may be driven by different operation clocks. For example, the processors may be processors of the same type or may be composed of processors of different types.

The CPU may include at least one cluster, and each cluster may be configured to include a plurality of CPU cores. The CPU cores may process a plurality of instructions and data constituting a software. For example, the CPU cores may fetch the plurality of instructions or data, process the fetched instructions or data, and store the fetched instructions or data in an internal register. At this time, the software may include a software embedded in an SoC or a software developed in a user environment of a user.

A graphics processing unit (hereinafter, generally referred to as a 'GPU') performs various graphic operations in response to a request from the CPU. That is, the GPU may convert the data for which processing is requested into data fit for display. The GPU has an operation structure advantageous for parallel processing that similar operations are repeatedly processed. The GPU may generate a scene according to an instruction of the OSs and output the generated scene to a display device.

The GPU can not only perform computations for computer graphics, but can also be used for computations in application programs. Stream processing may be performed on the data by connecting a programmable layer and high-precision operations with a graphics pipeline. The GPU executes one kernel at a time in parallel on many records in a flow.

The GPU may include a plurality of cores. The plurality of cores may be homogeneous cores or heterogeneous cores. The foremost role of the GPU is to spread an image on a screen. However, as the number of cores that can be integrated relatively cheaply compared to the past increases due to the development of a hardware, the remaining cores other than a core performing image rendering for spreading the image can be used for general purposes, such as a floating point operation and a scientific computation.

Each CPU may be a chipset including a system memory, and the GPU may be a special purpose processor for processing graphic data such as a video game.

In general, the GPU is configured to be delegated codes and data of jobs to be processed mainly via a CPU through a memory interface, to copy the codes and data on a GPU local memory, and to recopy a result obtained by processing the codes and data onto a main memory of the CPU. For this, in an integrated system including a CPU and a GPU (system on chip, hereinafter, collectively referred to as 'SoC'), the CPU controls the GPU via a bus interface.

In addition, a hypervisor provides a virtual environment in which OSs can use hardware. For example, the hypervisor provides a virtual environment in which OSs create scenes using GPUs. In other words, OSs can share and use the GPUs via the hypervisor.

In addition, in the specification, a standalone OS means an independent OS that does not use a library, an external module, or another OS for booting. Therefore, an OS that boots for itself without a hypervisor is referred to as a standalone OS. In addition, a guest OS refers to a virtualization OS driven by using a virtualization software mounted on a host OS.

In the specification, the host OS serves to control a whole system, that is, to configure and initialize the GPU, and the standalone OS or the hypervisor may function as the host OS.

According to an embodiment, GPU configuration and initialization may be controlled by only one host OS.

According to another embodiment, GPU configuration and initialization may be controlled by all OSs. Here, when a power is turned on, one of the OSs becomes a main OS. For example, the standalone OS becomes the main OS. At this time, the main OS serves to configure and initialize the GPU only when restarting the entire system. However, when several OSs take part in GPU configuration and initialization, a complexity of controlling the GPU may be increased.

Accordingly, by limiting so that one host OS performs GPU configuration and initialization, an efficient operation of a system-on-chip can be facilitated.

The GPU configuration and initialization may include performing a plurality of basic settings (register setting), uploading a necessary firmware (FW), and configuring the GPU to be able to perform a job requested by the CPU, and the like through operating the uploaded FW. Here, the basic settings include a clock, a control bit setting, and the like.

In an embodiment of the present invention, a method that a plurality of OSs or a plurality of CPUs shares a GPU supporting multi-master with one SoC regardless of whether there is a hypervisor is described.

An SoC sharing a GPU supporting multi-master according to an embodiment of the present invention and a method for operating the GPU will be described with reference to the drawings.

In this case, the configuration of the embodiments of the present invention schematically shows only the configuration related to the present invention, and general configurations such as a power supply unit are omitted. However, such a description does not indicate that the general configurations are not included in the embodiments of the present invention.

FIG. 1 is a block diagram showing a configuration of a system-on-chip (SoC) according to an embodiment of the present invention.

Referring to FIG. 1, an SoC 100 includes one GPU 110 and two CPUs (CPU_1 and CPU_2) 120 and 130. The GPU 110 and the CPUs 120 and 130 communicate with each other via an on-chip bus fabric 140.

Each of the CPUs 120 and 130 may perform various functions, and one of them may serve to control a whole system of the SoC.

The CPUs 120 and 130 execute respective OSs. The CPU_1 120 executes a standalone OS_1 121, and the CPU_2 130 executes a standalone OS_2 131.

The GPU 110 supports multi-master. Accordingly, the GPU 110 may simultaneously receive jobs from a plurality of OSs 121 and 131, and process the received jobs.

At this time, a state monitoring device_1 150 is connected between the CPU_1 120 and the GPU 110, and a state monitoring device_2 160 is connected between the CPU_2 130 and the GPU 110.

When the SoC 100 is powered on, one OS among OSs mounted on the SoC 100 operates as a host OS, which is a predetermined operation. For example, the standalone OS_1 121 may operate as the host OS.

After the standalone OS_1 121 performed the configuration and initialization of the GPU 110, the standalone OS_1 121 and the standalone OS_2 131 can freely share and utilize the GPU 110.

In a stable system, even though abnormal states, such as reset, restart, and reboot, of the CPUs 120 and 130, and the OSs 121 and 131 occurs, the shared GPU 110 should process all job requests requested by the OSs 121 and 131.

Execution state information of OSs is generally transmitted to the GPU 100 by a hypervisor. However, in a structure without the hypervisor as shown in FIG. 1, there is no way to transmit the execution state information of OSs 121 and 131 to the GPU 110. Accordingly, even if an abnormal state occurs in any of the OSs 121 and 131, the GPU 110 does not recognize the occurrence of the abnormal state, thereby becoming a problem.

However, in an embodiment of the present invention, the state monitoring devices 150 and 160 connected to each of the CPUs 120 and 130 check the execution state information of each of the OSs 121 and 131, and then transmit the information to the GPU 110. Thus, the GPU can recognize the abnormal state of the CPUs 120 and 130 or the OSs 121 and 131 executed in each of the CPUs 120 and 130. As a result, an abnormal request besides other normal requests can be properly processed.

If the standalone OS_1 121 functioning as the host OS and the CPU_1 120 equipped with the standalone OS_1 121 operate abnormally, the GPU configuration and initialization are suspended during rebooting the standalone OS_1 121. During rebooting, the host OS 121 does not access the suspended GPU configuration. During rebooting, the host OS 121 checks a configuration state in order to ensure stable operation of other execution jobs requested by other cores. After rebooting, the host OS 121 may control the GPU configuration and submit jobs to the GPU 110.

Meanwhile, if the standalone OS_2 131, not being the host OS, and the CPU_2 130 equipped with the standalone OS_2 131 operate abnormally, the GPU configuration may be controlled by the host OS 121. After rebooting the abnormal OS 131 not being the host OS 121, a job submission is restarted not from the host OS 121 but from the standalone OS_2 131.

Figure 2:
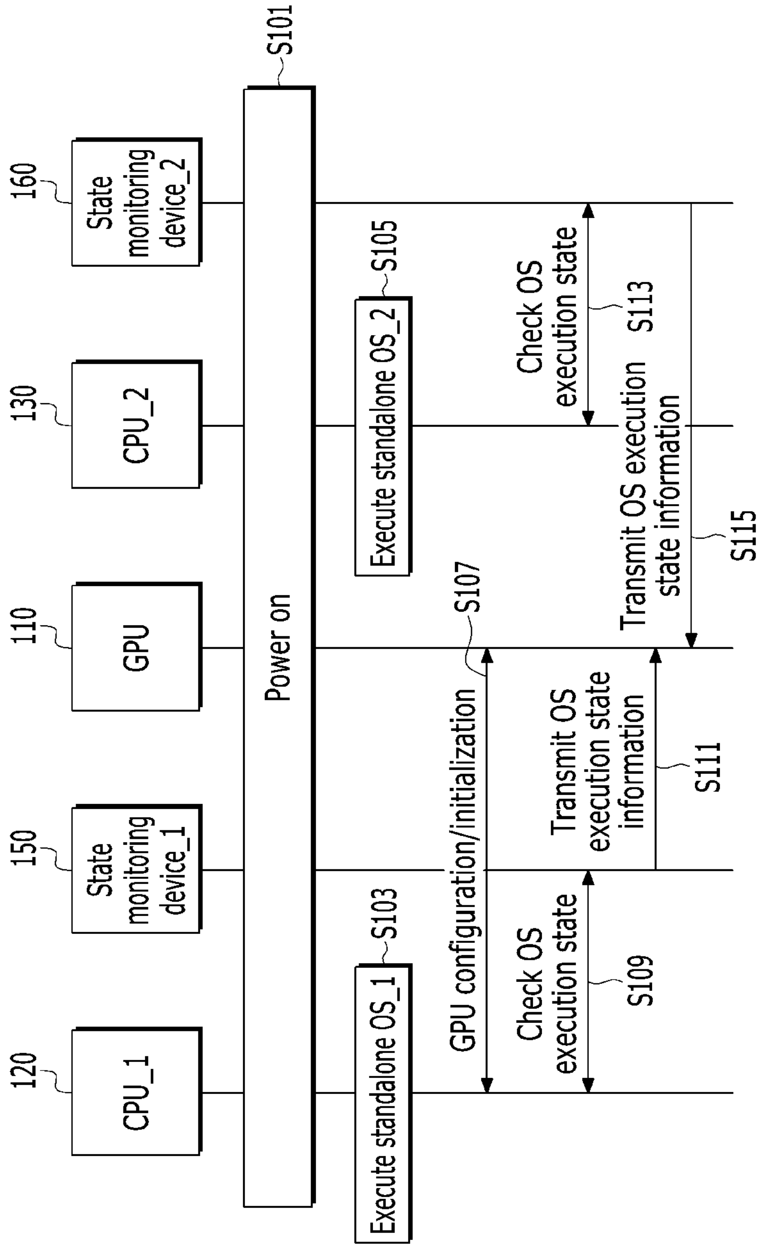
FIG. 2 illustrates an operation of a SoC 100 shown in FIG. 1.

FIG. 2 illustrates an operation of an SoC 100 shown in FIG. 1.

Referring to FIG. 2, when an SoC 100 is powered on (S101), a CPU_1 120 executes a standalone OS_1 121 (S103), and a CPU_2 130 executes a standalone OS_2 131 (S105).

The standalone OS_1 121 of the CPU_1 120 interworks with the GPU 110 to perform GPU configuration and initialization (S107).

The standalone OS_1 121 of the CPU_1 120 provides OS execution state information to a state monitoring device_1 150 in response to a request from the state monitoring device_1 150 (S109). Here, step S109 may be performed every period set between the standalone OS_1 121 of the CPU_1 120 and the state monitoring device_1 150, or may be performed when a specific event (e.g., an abnormal operation) occurs.

The state monitoring device_1 150 transmits the execution state information of the standalone OS_1 121 collected through step S109, to the GPU 110 (S111).

Additionally, the standalone OS_2 131 of the CPU_2 130 provides the OS execution state information to the state monitoring device_2 160 in response to a request from a state monitoring device_2 160 (S113). At this time, step S113 may be performed every period set between the standalone OS_2 131 of the CPU_2 130 and the state monitoring device_2 160, or may be performed when a specific event (e.g., an abnormal operation) occurs.

The state monitoring device_2 160 transmits the execution state information of the standalone OS_2 131 collected through step S113, to the GPU 110 (S115).

Figure 3:
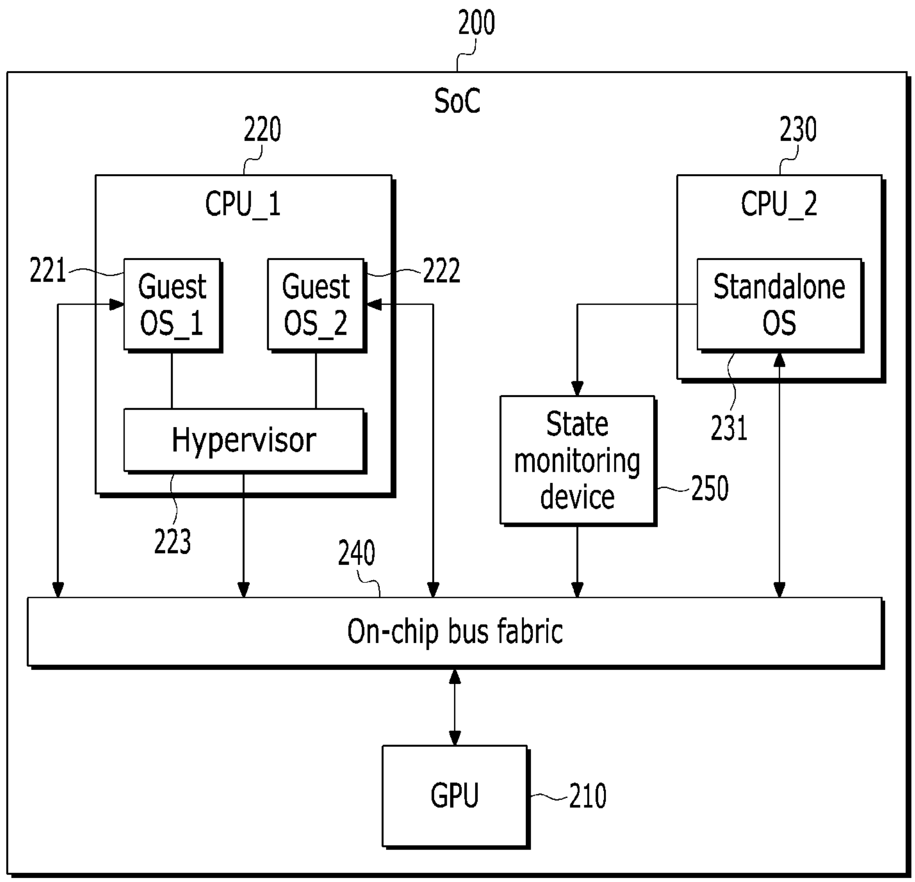
FIG. 3 is a block diagram showing a configuration of a SoC according to another embodiment of the present invention.

FIG. 3 is a block diagram showing a configuration of an SoC according to another embodiment of the present invention, and shows a structure different from that of FIG. 1. Here, a description of the same configuration as in FIG. 1 will be omitted.

Referring to FIG. 3, an SoC 200 includes one GPU 210 and two CPUs 220 and 230. The GPU 210 and the CPUs 220 and 230 communicate with each other via an on-chip bus fabric 240.

In this case, the CPU_1 220 includes a plurality of guest OSs 221 and 222 and a hypervisor 223 executing the plurality of guest OSs 221 and 222. The CPU_1 220 executes the guest OS_1 221 and the guest OS_2 222.

The CPU_2 230 includes a standalone OS 231, and the CPU_2 230 is connected to a state monitoring device 250. That is, the state monitoring device 250 is connected only between the CPU_2 230 and the GPU 210.

In this case, execution state information of the guest OSs 221 and 222 is transmitted to the GPU 210 via the hypervisor 223, and execution state information of the standalone OS 231 is transmitted to the GPU 210 via the state monitoring device 250.

When the power is turned on, one of the OSs 221, 222, and 231 becomes a host OS. At this time, the standalone OS 231 of the CPU_2 230 may be a host OS. Accordingly, only the standalone OS 231 can configure and initialize the GPU 210. After the standalone OS 231 configures and initializes the GPU 210, all OSs, that is, the guest OS_1 221, the guest OS_2 222, and the standalone OS 231 can freely share the GPU 210.

Even in an abnormal state, such as reset, restart, reboot, or crash, of the CPUs 220 and 230, and OSs 221, 222, 231, the shared GPU 210 should be able to process all jobs requested by a plurality of OSs 221, 222, and 231.

In the CPU_1 220 equipped with the hypervisor 223, a state monitoring device is not required. The hypervisor 223 transmits execution state information of the guest OSs 221 and 222 executed in the CPU_1 220 to the GPU 210.

On the other hand, the state monitoring device 250 checks the execution state information of the standalone OS 231 executed in the CPU_2 230 and then transmits the information to the GPU 210.

Accordingly, even though one of the OSs 221, 222, and 231 operates abnormally, the GPU 210 can recognize the abnormality. As a result, the GPU 210 can process an abnormal request besides general requests.

If a CPU operates abnormally and an OS executed in the CPU is a host OS, namely the standalone OS 231, GPU configuration is suspended during rebooting. During rebooting, the host OS 231 does not access the suspended GPU configuration. During rebooting, the host OS 231 identifies and checks configuration state in order to ensure stable operation of other execution jobs requested by other cores.

After rebooting, the host OS 231 can control the GPU configuration and submit jobs to the GPU 210. When a CPU operates abnormally and an OS executed in the CPU is not a HOST OS, the GPU configuration may be controlled by the host OS 231. After rebooting the abnormal OS not being the host OS, job submission is restarted from an OS not being the host OS.

Figure 4:
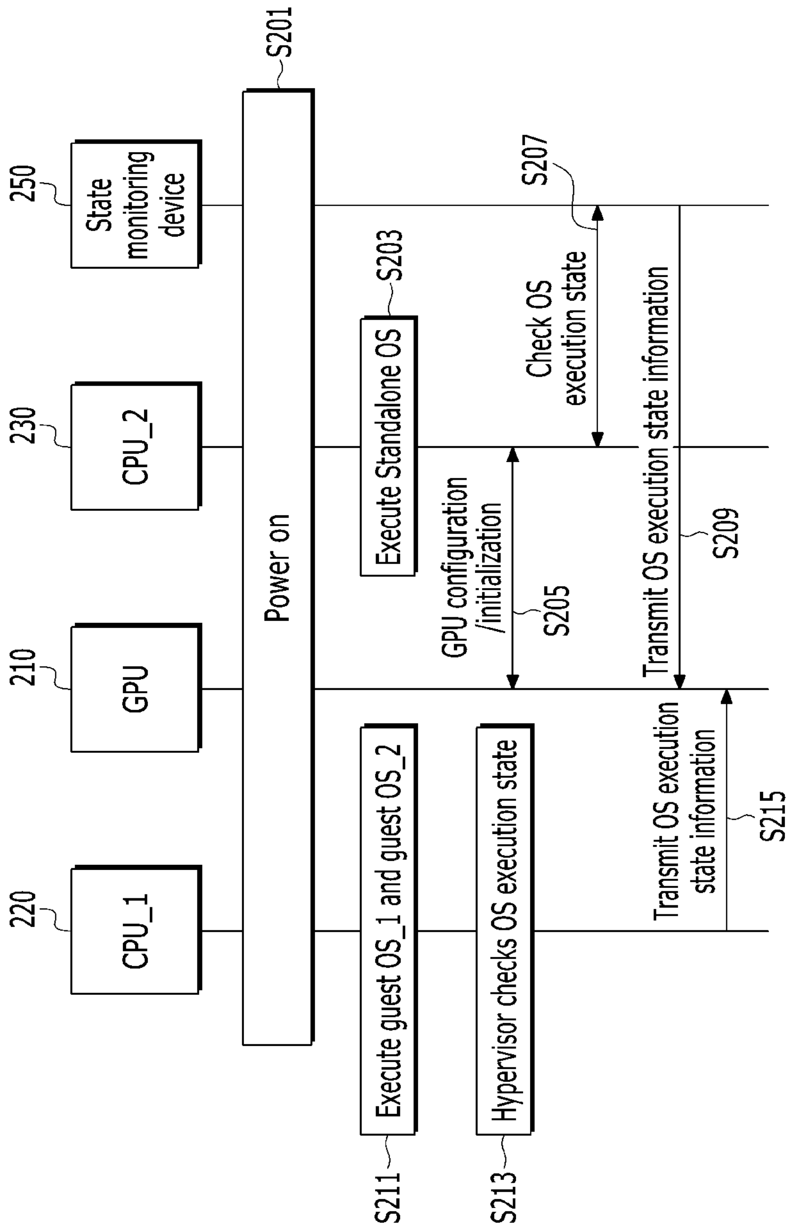
FIG. 4 illustrates an operation of an SoC shown in FIG. 3.

FIG. 4 illustrates an operation of an SoC shown in FIG. 3.

Referring to FIG. 4, when an SoC 100 is powered on (S201), a CPU_2 230 executes a standalone OS 231 (S203). Here, the standalone OS 231 operates as a host OS. Accordingly, the standalone OS 231 of the CPU_2 230 performs GPU configuration and initialization through interworking with a GPU 210 (S205).

The standalone OS 231 of the CPU_2 230 provides OS execution state information to a state monitoring device 250 in response to a request from the state monitoring device 250 (S207). At this time, step S207 may be performed every period set between the standalone OS 231 of the CPU_2 230 and the state monitoring device 250, or may be performed when a specific event (e.g., abnormal operation) occurs.

The state monitoring device 250 transmits the execution state information of the standalone OS 231 collected through step S207, to the GPU 210 (S209).

In addition, the CPU_1 220 executes a guest OS_1 221 and a guest OS_2 222 (S211). A hypervisor 223 of the CPU_1 220 checks the execution state information of the guest OSs 221 and 222 executed in step S211 (S213). In this case, step S213 may be performed every set period or may be performed when a specific event (e.g., abnormal operation) occurs.

The hypervisor 223 of the CPU_1 220 transmits the execution state information of the guest OSs 221 and 222 collected through step S213, to the GPU 210 (S215).

Figure 5:
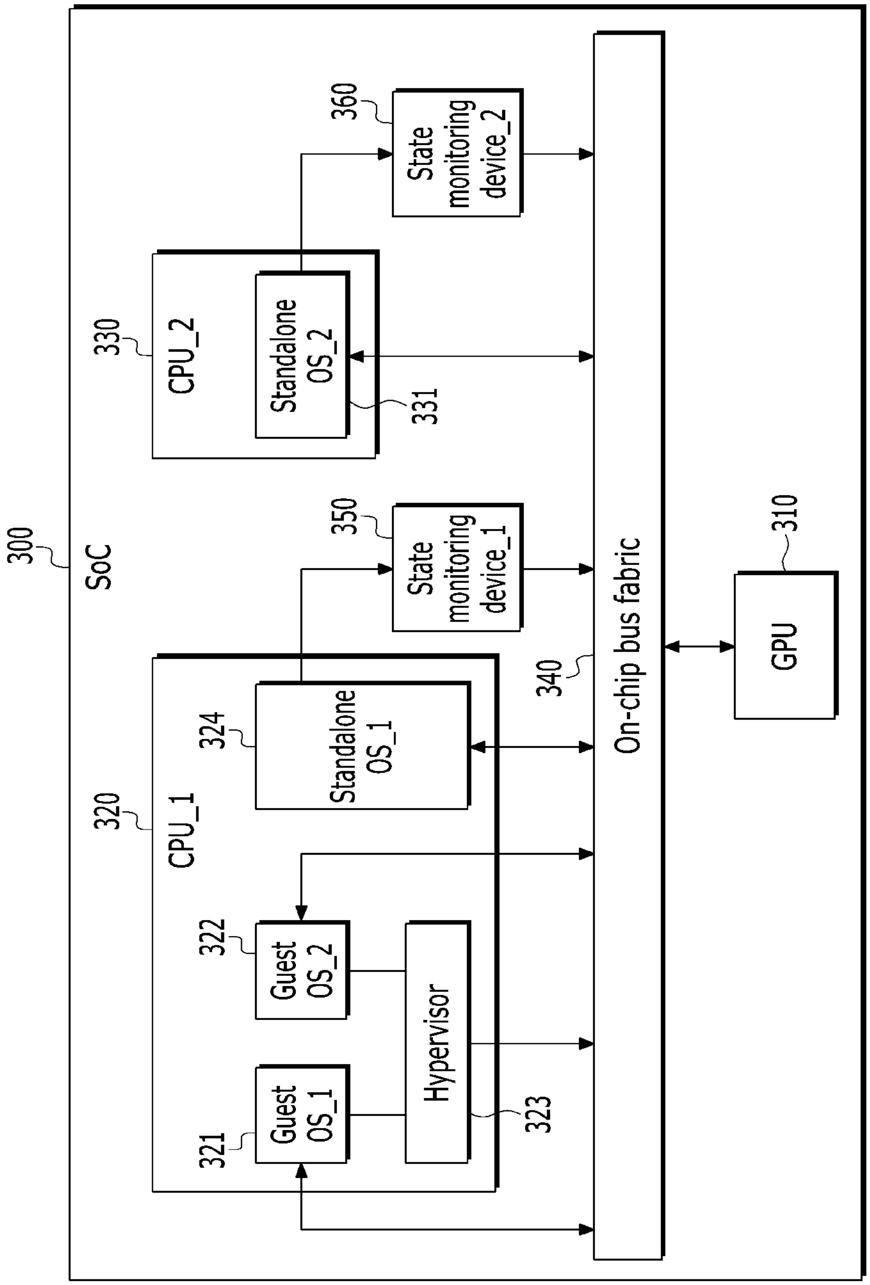
FIG. 5 is a block diagram showing an SoC structure according to another embodiment of the present invention.

FIG. 5 shows an SoC structure according to another embodiment of the present invention, and shows an embodiment in which the embodiments shown in FIG. 1 and FIG. 3 are merged. Here, a description of the same configuration as in FIG. 1 and FIG. 3 will be omitted.

Referring to FIG. 5, an SoC 300 includes one GPU 310 and two CPUs 320 and 330. The GPU 310 and the CPUs 320 and 330 communicate with each other via an on-chip bus fabric 340.

Here, the CPU_1 320 includes a guest OS_1 321, a guest OS_2 322, a hypervisor 323, and a standalone OS_1 324. The CPU_2 330 includes a standalone OS_2 331.

The CPU_1 320 executes a plurality of guest OSs 321 and 322 based on the hypervisor 323. The CPU_1 320 independently executes the standalone OS_1 324. In this case, a state monitoring device_1 350 is connected between the CPU_1 320 and the GPU 310. Here, execution state information of the guest OSs 321 and 322 is transmitted to the GPU 310 via the hypervisor 323. The execution state information of the standalone OS_1 is transmitted to the GPU 310 via the state monitoring device_1 350.

The CPU_2 330 executes the standalone OS_2 331, and a state monitoring device_2 360 is connected to the CPU_2 330. Execution state information of the standalone OS_2 331 is transmitted to the GPU 310 via the state monitoring device_2 360.

At this time, the SoC has two standalone OSs. According to an embodiment, it may be limited so that only one standalone OS 324 or 331 configures and initializes the GPU. According to another embodiment, all of the standalone OSs 324 or 331 may be set to configure and initialize the GPU. In this case, one of the standalone OSs 324 or 331 is set as a main OS, and the main OS can serve to configure and initialize the GPU only when an entire system is restarted.

After the GPU configuration and initialization, all OSs in the SoC freely share and utilize the GPU 310. In a stable system, in abnormal states, such as reset, restart, reboot, or crash, of CPU and OS, the shared GPU can process all jobs requests from several OSs.

Even if any of the OSs 321, 322, 324, and 331 operates abnormally, the GPU 310 can recognize the abnormality through state monitoring. Thus, the GPU 310 can process an abnormal request besides normal requests.

Figure 6:
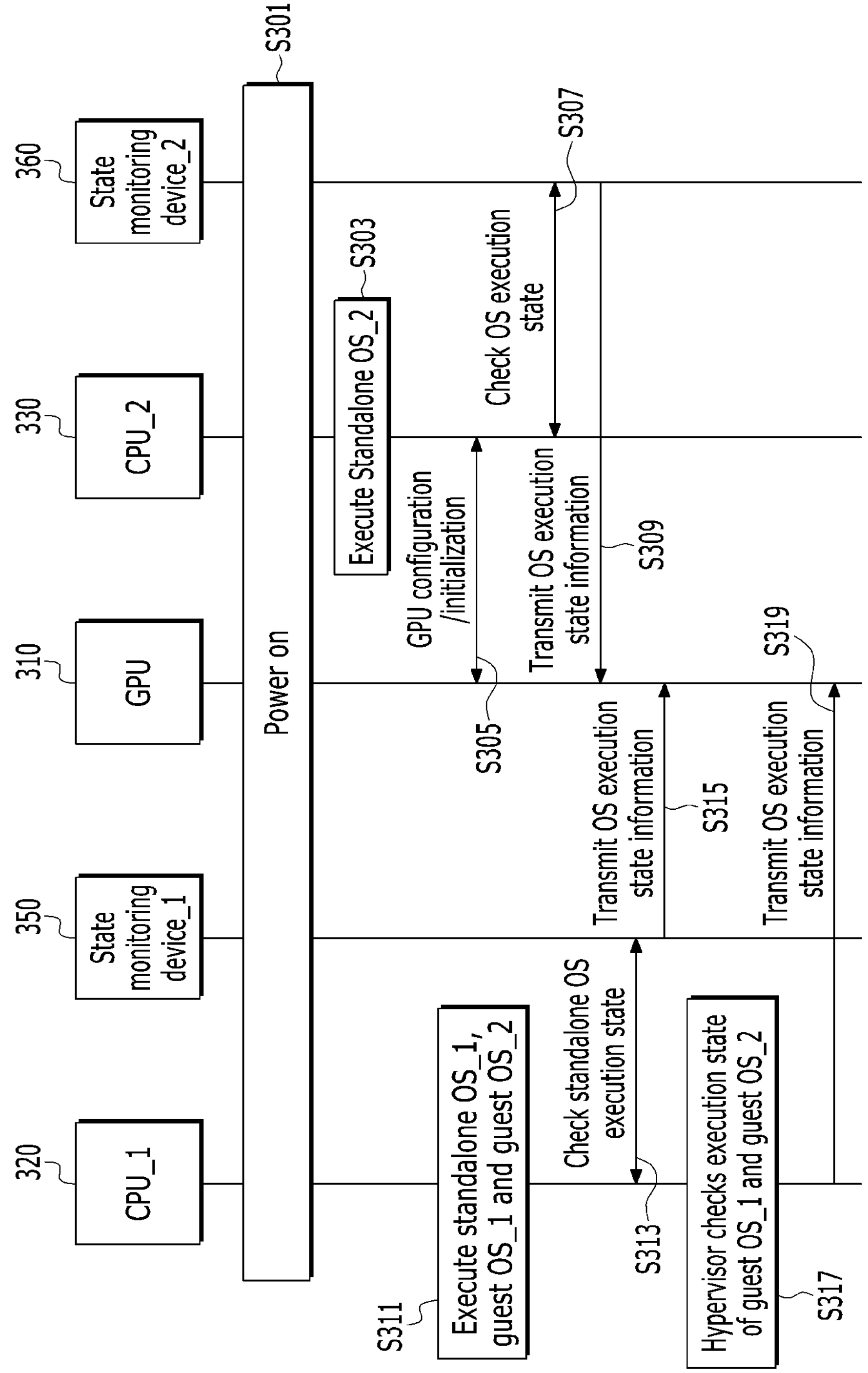
FIG. 6 illustrates an operation of an SoC shown in FIG. 5.

FIG. 6 illustrates an operation of an SoC shown in FIG. 5.

Referring to FIG. 6, when an SoC 300 is powered on (S301), a CPU_2 330 executes a standalone OS_2 331 (S303).

At this time, the standalone OS_2 331 operates as a host OS. Accordingly, the standalone OS_2 331 of the CPU_2 330 performs configuration and initialization of the GPU while interworking with the GPU 210 (S305).

The standalone OS_2 331 of the CPU_2 330 provides OS execution state information to a state monitoring device_2 360 in response to a request from the state monitoring device_2 360 (S307).

The state monitoring device_2 360 transmits the execution state information of the standalone OS_2 331 collected through step S307, to the GPU 310 (S309).

In addition, a CPU_1 320 executes a standalone OS_1 324, a guest OS_1 321, and a guest OS_2 322 (S311).

A state monitoring device_1 350 checks execution state of the standalone OS_1 324 by interworking with the CPU_1 320 (S313). Then, the execution state information collected in step S313 is transferred to the GPU 310 (S315).

A hypervisor 323 of the CPU_1 320 checks execution state information of the guest OSs 321 and 322 executed in step S311 (S317). The hypervisor 323 of the CPU_1 320 transmits the execution state information of the guest OSs 321 and 322 collected through step S317, to the GPU 310 (S319).

Here, step S307, step S313, and step S317 may be performed every set period or may be performed when a specific event (e.g., abnormal operation) occurs.

Figure 7:
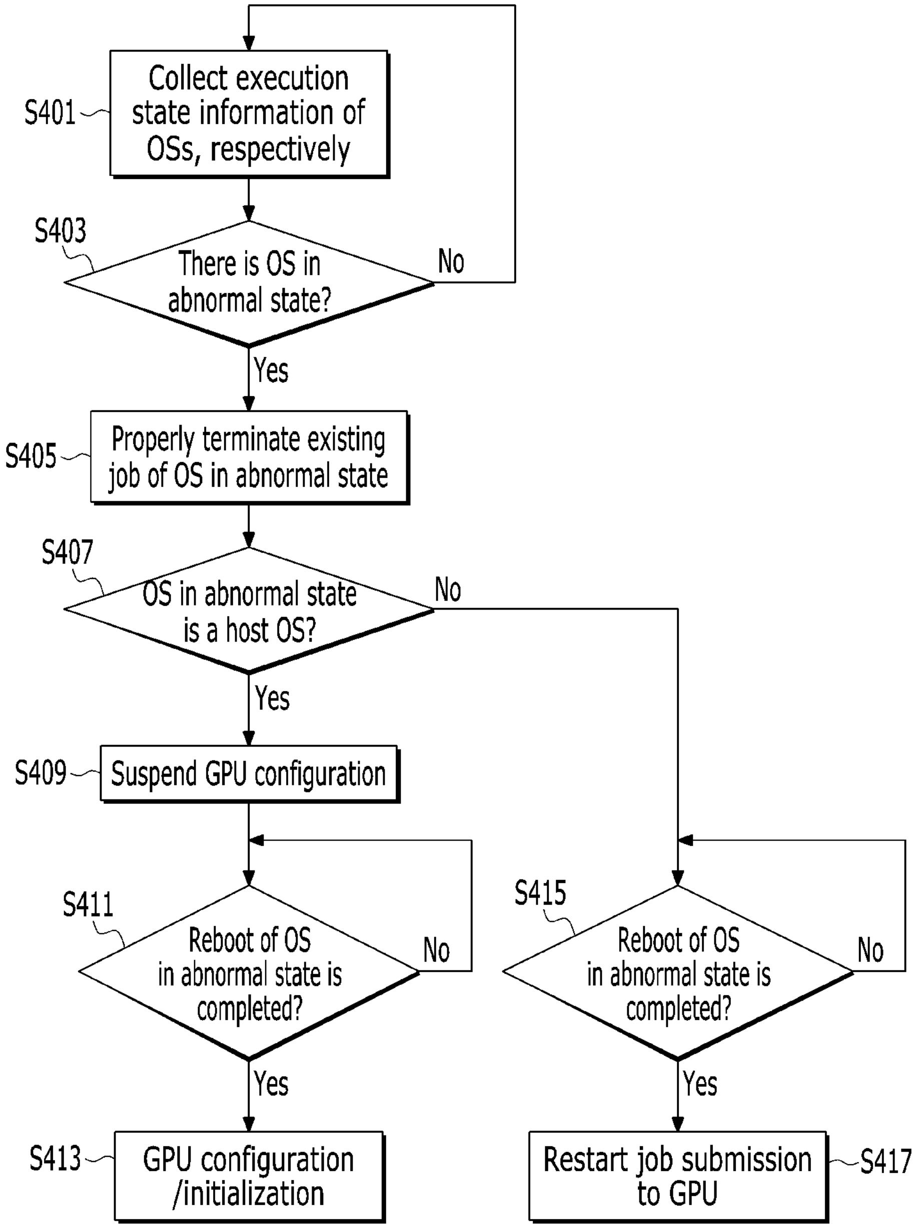
FIG. 7 is a flowchart showing an operation of a GPU according to an embodiment of the present invention.

FIG. 7 is a flowchart showing an operation of a GPU according to an embodiment of the present invention, and shows the operation of a GPU according to the embodiment as shown in FIG. 1 to FIG. 6.

Referring to FIG. 7, a GPU (110 in FIG. 1, 210 in FIG. 3, 310 in FIG. 5) collects execution state information of OSs from at least one of state monitoring device (150 and 160 in FIG. 1, 210 in FIG. 3, 310 in FIG. 5) or a hypervisor (223 in FIG. 3, 323 in FIG. 5), respectively (S401).

The GPUs 110, 210, and 310 determine whether there is an OS in an abnormal state based on the collected execution state information (S403).

If there is an OS in an abnormal state, an existing job of the OS in an abnormal state is properly terminated (S405). The abnormal state may be one of reset, restart, reboot, and crash.

The GPUs 110, 210, and 310 determine whether the OS in an abnormal state is a host OS (S407). When it is determined that the OS in an abnormal state is the host OS, the GPUs 110, 210, and 310 suspend GPU configuration (S409).

The GPUs 110, 210, and 310 determine whether a reboot of the host OS is completed (411), and restart the GPU configuration and initialization when it is determined that the reboot is completed (S413).

Meanwhile, if it is determined that the OS in an abnormal state is not the host OS in step S407, the GPUs 110, 210, and 310 determine whether the reboot of the OS in an abnormal state is completed (S415).

When the OS in an abnormal state is rebooted, the GPUs 110, 210, and 310 receive again a job from the rebooted OS (S417).

As above described, the GPUs 110, 210, and 310 perform jobs requested by several OSs. If there is no need to perform corresponding jobs any more due to a problem of an arbitrary OS, but the GPUs 110, 210, and 310 cannot recognize the abnormal state of the OS, the jobs of the OS cannot be properly terminated. Accordingly, GPU resource may be wasted or halted (Hanging).

However, according to an embodiment of the present invention, since the GPUs 110, 210, and 310 collect state information of OSs through the state monitoring devices 150, 160, 250, 350, and 360 or the hypervisors 223 and 323, the GPUs 110, 210, and 310 can control an operation of an OS in abnormal state.

In general, in a normal state, the GPUs 110, 210, and 310 perform jobs requested by application programs executed in a plurality of masters (OSs). However, when one OS is rebooted, jobs requested to be executed by the corresponding OS remain in a current execution state on the GPUs 110, 210, and 310. However, since the GPUs 110, 210, and 310 can know such a situation, the jobs being executed in response to a request from the corresponding OS are properly terminated. As a result, it is avoided that performing jobs requested from another OS is hindered or GPU resources are unnecessarily used.

The embodiment of the present invention described above is not implemented only through the apparatus and method, but may be implemented through a program for realizing a function corresponding to the configuration of the embodiment of the present invention or a recording medium in which the program is recorded.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A method of operating a GPU mounted on an SoC, the method comprising:

collecting execution state information of operating systems respectively executed by at least two CPUs;

determining whether there is an operating system operating in an abnormal state based on the execution state information; and terminating an existing job of the operating system determined to be operating in the abnormal state and waiting until a reboot of the operating system determined to be operating in the abnormal state is completed, wherein the GPU performs a sharing operation that processes jobs requested by the operating systems, and the execution state information is collected via a bus interface that is connected to a state monitoring device connected to at least one of the at least two CPUs, and wherein one of the operating systems operates as a host operating system, and, when the operating system operating in the abnormal state is the host operating system, configuration of the GPU is suspended until a reboot of the host operating system is completed.

2. The method of claim 1, wherein the execution state information is collected from a hypervisor executed in an arbitrary CPU, and comprises execution state information of at least one guest operating system executed by the hypervisor.

3. The method of claim 1, wherein the execution state information comprises:

execution state information of at least one standalone operating system collected via the bus interface that is connected to the state monitoring device connected to the at least one of the at least two CPUs; and execution state information of at least one guest operating system collected from a hypervisor executed in an arbitrary CPU.

* * * * *